(12) United States Patent
Singhal

(10) Patent No.: US 7,509,362 B2
(45) Date of Patent: Mar. 24, 2009

(54) NON-LINEAR FUNCTION APPROXIMATION USING FINITE ORDER POLYNOMIAL IN FIXED-POINT ARITHMETIC

(75) Inventor: Manoj Singhal, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 860 days.

(21) Appl. No.: 10/464,626

(22) Filed: Jun. 18, 2003

(65) Prior Publication Data

US 2004/0267851 A1    Dec. 30, 2004

(51) Int. Cl.
G06F 1/02 (2006.01)

(52) U.S. Cl. ....................................... 708/270

(58) Field of Classification Search ................. 708/270
See application file for complete search history.

(56) References Cited

U.S. PATENT DOCUMENTS

| | | | | |
|---|---|---|---|---|
| 5,949,695 | A * | 9/1999 | Snell | 708/270 |
| 6,900,747 | B2 * | 5/2005 | Lee | 708/235 |
| 2004/0107091 | A1 * | 6/2004 | Lee | 704/201 |

* cited by examiner

*Primary Examiner*—Tan V Mai
(74) *Attorney, Agent, or Firm*—McAndrews Held & Malloy Ltd.

(57) ABSTRACT

A system, method, and apparatus for calculating non-linear functions with finite order polynomials are presented herein. Use of finite order polynomials allow calculation of the non-linear functions using fixed point arithmetic operations resulting in significant cost savings.

26 Claims, 9 Drawing Sheets

NON-LINEAR FUNCTION APPROXIMATION USING FINITE ORDER POLYNOMIAL IN FIXED-POINT ARITHMETIC

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

In embedded systems, memory and die size are important factors in determining the final cost of integrated circuits. Integrated circuits are used for a variety of applications including audio and video decoders.

Arithmetic operations of digital signal processors are often performed in fixed point as opposed to floating point in many integrated circuits. Performance of arithmetic operations in fixed point reduces the memory and die size of the integrated circuit.

A collection of N binary digits has $2^N$ possible states. In the most general sense, these states can represent many things. There is no meaning inherent in a binary word. However, the meaning of an N-bit binary word depends entirely on its interpretation. In an N-bit word, if the decimal point is deemed to be at the extreme right, any unsigned integer from 0 to $2^N-1$ can be represented. Alternatively, any signed integer from $-2^{N-1}$ to $2^{N-1}-1$ can be represented. For example, where N=16, any integer number from −32768 to 32767 can be represented.

If the decimal point is placed one position left from the extreme right (i.e., the least significant bit of the register), then the dynamic range of the number is reduced by a factor of two but the resolution is increased by the same factor of two. Accordingly, there is a tradeoff between the dynamic range and the resolution. For example, where N=32, a signed number represented in a Q(1, 31) format (1 integer bit, 31 decimal bits), has a dynamic range between −1 and slightly less than 1, but with $2^{-31}$ resolution.

Generally most computations in fixed point arithmetic are done in Q(1, 31) format since it gives the highest possible resolution. If the dynamic range before the computation is outside −1 to 1, the number is appropriately scaled by left shifting so that the desired number can be represented in Q(1, 31)format(assuming the register width is 32 bits wide).

However, the computation of non-linear functions, such as, for example, exponential functions, is complex. For example, in the case of an MPEG-2 AAC decoder and MPEG-1 Layer-3 Decoder, spectral values are Huffman coded. In the decoder, the spectral values are Huffman decoded and need to be scaled by raising them to a 4/3 exponential factor (e.g., $F(x)=x^{4/3}$) in the inverse quantization block. The Huffman decoded spectral values are in the range of 0 to 8191 ($2^{13}-1$).

Further limitations and disadvantages of conventional and traditional approaches will become apparent to one of skill in the art through comparison of such systems with embodiments presented in the remainder of the present application with reference to the drawings.

BRIEF SUMMARY OF THE INVENTION

Presented herein are system(s), method(s), and apparatus for non-linear function approximation using finite order polynomial in fixed-point arithmetic.

In one embodiment, there is presented a method for approximating a non-linear function for a particular value. The method includes determining a range for the particular value, scaling the value to another range, calculating with fixed point arithmetic operations a finite order polynomial function for the scaled value, and denormalizing the finite order polynomial function for the scaled value by multiplying the finite order polynomial function with a scaling constant associated with the range.

In another embodiment, there is presented a circuit for approximating a non-linear function for a particular value. The circuit includes a processor and memory connected to the processor. The memory stores instructions that cause determining a range comprising the particular value, scaling the value to another range, thereby resulting in a scaled value, calculating with fixed point arithmetic operations, a finite order polynomial function for the scaled value, and denormalizing the finite order polynomial function for the scaled value by multiplying the finite order polynomial function with a scaling constant associated with the range comprising the particular value.

In another embodiment, there is presented a decoder system for decoding compressed audio and/or video data. The decoder system includes a Huffman decoder, and an inverse quantizer. The Huffman decoder decodes Huffman coded values, resulting in quantized values. The inverse quantizer dequantizes the quantized values, wherein the inverse quantizer calculates a function, $F(x)=x^{4/3}$ with a finite order polynomial using fixed point arithmetic operations.

These and other advantages and novel features of the present invention, as well as details of an illustrated embodiment thereof, will be more fully understood from the following description and drawings.

DETAILED DESCRIPTION OF THE INVENTION

A non-linear function F(x) can be approximated by a finite order polynomial $f(x)=a_N x^N + a_{N-1} x^{N-1} + \ldots + a_2 x^2 + a_1 x + a_0$, where the coefficients $a_N, \ldots a_0$, are constants, for a particular range, 0 to A, of x.

The coefficients $a_N, \ldots a_0$, for the range 0 to A, can be determined by taking known F(x) for N+1 non-uniform x values, $x_N \ldots x_0$, and solving N+1 equations for the N+1 coefficients, $a_N, \ldots a_0$. The equations are:

$$a_N x_0^N + a_{N-1} x_0^{N-1} + \ldots + a_2 x_0^2 + a_1 x_0 + a_0 = F(x_0)$$
$$a_N x_1^N + a_{N-1} x_1^{N-1} + \ldots + a_2 x_1^2 + a_1 x_1 + a_0 = F(x_1)$$
$$a_N x_2^N + a_{N-1} x_2^{N-1} + \ldots + a_2 x_2^2 + a_1 x_2 + a_0 = F(x_2)$$
$$a_N x_3^N + a_{N-1} x_3^{N-1} + \ldots + a_2 x_3^2 + a_1 x_3 + a_0 = F(x_3)$$
$$\vdots$$
$$a_N x_{N-1}^N + a_{N-1} x_{N-1}^{N-1} + \ldots + a_2 x_{N-1}^2 + a_1 x_{N-1} + a_0 = F(x_{N-1})$$
$$a_N x_N^N + a_{N-1} x_N^{N-1} + \ldots + a_2 x_N^2 + a_1 x_N + a_0 = F(x_N)$$

The foregoing equations can be represented in matrix form as:

$$\begin{bmatrix} x_0^N & x_0^{N-1} & \ldots & x_0^2 & x_0 \\ x_1^N & x_1^{N-1} & \ldots & x_1^2 & x_1 \\ x_2^N & x_2^{N-1} & \ldots & x_2^2 & x_2 \\ x_3^N & x_3^{N-1} & \ldots & x_3^2 & x_3 \\ & & \vdots & & \\ x_{N-1}^N & x_{N-1}^{N-1} & \ldots & x_{N-1}^2 & x_{N-1} \\ x_N^N & x_N^{N-1} & \ldots & x_N^2 & x_N \end{bmatrix} \begin{bmatrix} a_N \\ a_{N-1} \\ a_{N-2} \\ a_{N-3} \\ \vdots \\ a_1 \\ a_N \end{bmatrix} = \begin{bmatrix} F(x_0) \\ F(x_1) \\ F(x_2) \\ F(x_3) \\ \vdots \\ F(x_{N-1}) \\ F(x_N) \end{bmatrix}$$

So $X_{(N+1)*(N+1)} A_{(N+1)*1} = F_{(N+1)*1}$ and $A = X^{-1} F$

Where $X^{-1}$ is the inverse of X of order (N+1) (N+1).

F is the matrix of all the values computed for F(x) at different points $x_0, \ldots x_N$.

The values for all the coefficients in matrix A are obtained by finding the inverse of the matrix X and multiplying by F to get the final values, $a_N \ldots a_0$. The matrix X can be inverted by using standard matrix inversion techniques such as Kramer's theorem.

For x values outside the range 0 to A, the x value is scaled. Any number of non-overlapping ranges for x can be defined with a minimum value, min, and a maximum value, max. The x value in a particular range min to max is scaled to the range 0 to A using the following formula:

Scaled Value=$A(x-\text{min})/(\text{max}-\text{min})$

The polynomial $f(x) = a_N x^N + a_{N-1} X^{N-1} + \ldots + a_2 x^2 + a_1 x + a_0$ is calculated for the scaled value. The result, f(scaled value) is then denormalized by multiplying f(scaled value) by a scaling constant. The scaling constant is a unique constant for each defined range. The scaling constant is f(min) for each predefined range.

Figure 1:
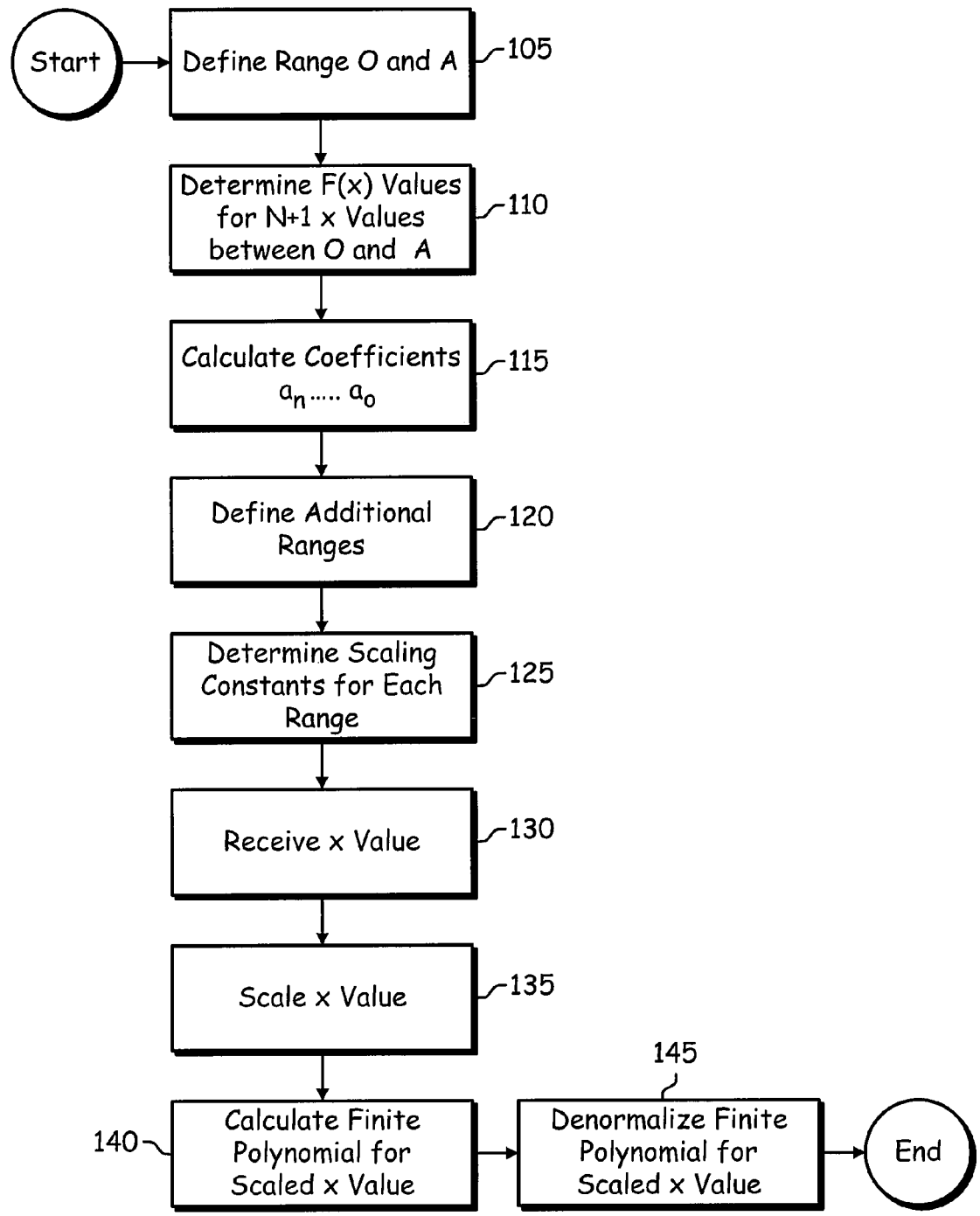
FIG. 1 is a flow diagram for calculating a non-linear function for a value in accordance with an embodiment of the present invention.

Referring now to FIG. 1, there is illustrated a flow diagram for approximating a non-linear function, F(x), with a finite order polynomial, f(x), in accordance with an embodiment of the present invention. At 105, a first range, 0 to A is defined. During 110, the values of the non-linear function F(x) are determined for N+1 non-uniform x values in the range 0 to A. At 115, the coefficients $a_N \ldots a_0$ are calculated. At 120, additional non-overlapping ranges A to $\text{max}_1$, $\text{min}_2$ to $\text{max}_2, \ldots, \text{min}_n$ to $\text{max}_n$ are defined. At 125, a scaling constant for each range is determined. The scaling constant for a range $\text{min}_y$ to $\text{max}_x$ can be $F(\text{min}_y)$, for example. At 130, an x value is received. At 135, the x value is scaled. The x value is scaled by determining which range, $\text{min}_y$ to $\text{max}_y$, comprises the x value. The scaled value for x can be:

Scaled Value=$A(x-\text{min}_y)/(\text{max}_y-\text{min}_y)$

At 135, f(Scaled Value) is determined, and denormalized during 140. Denormalization of f(Scaled Value) can be achieved by multiplying f(Scaled Value) by the scaling constant associated with range $\text{min}_y$ to $\text{max}_y$ containing x. The denormalized value is the approximate value of the function F(x) for the value received during 130.

Figure 2:
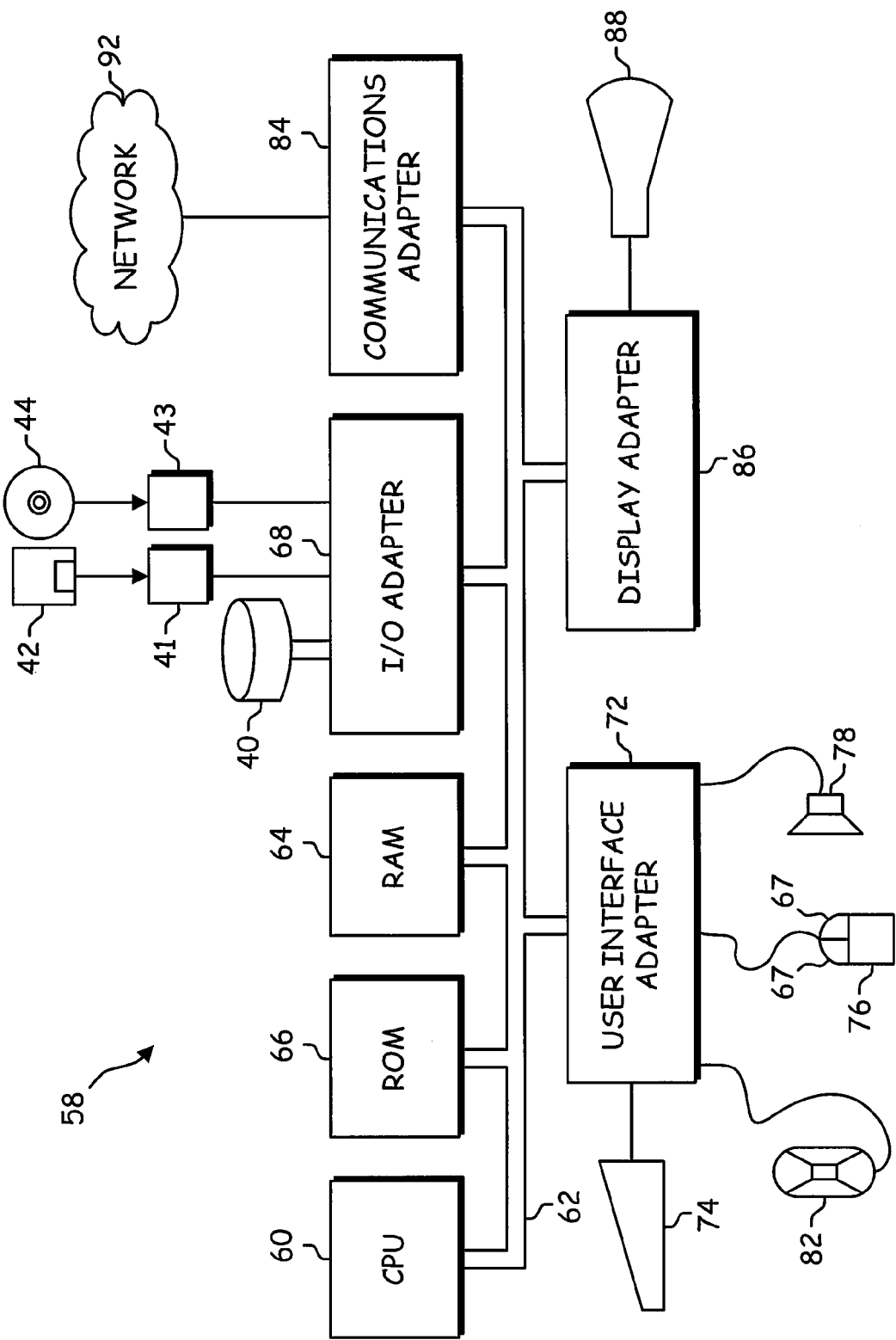
FIG. 2 is a block diagram of an exemplary computer system in accordance with an embodiment of the present invention.

Referring now to FIG. 2, there is illustrated a block diagram of a computer system in accordance with an embodiment of the present invention. A CPU 60 is interconnected via system bus 62 to random access memory (RAM) 64, read only memory (ROM) 66, an input/output (I/O) adapter 68, a user interface adapter 72, a communications adapter 84, and a display adapter 86. The input/output (I/O) adapter 68 connects peripheral devices such as hard disc drives 40, floppy disc drives 41 for reading removable floppy discs 42, and optical disc drives 43 for reading removable optical disc 44 (such as a compact disc or a digital versatile disc) to the bus 62. The user interface adapter 72 connects devices such as a keyboard 74, a mouse 76 having a plurality of buttons 67, a speaker 78, a microphone 82, and/or other user interfaces devices such as a touch screen device (not shown) to the bus 62. The communications adapter 84 connects the computer system to a network 92. The display adapter 86 connects a monitor 88 to the bus 62.

The communications adapter 84 connects the computer system 58 to other computers systems 58 over network 92. The computer network 92 can comprise, for example, a local area network (LAN), a wide area network (WAN), or the internet.

An embodiment of the present invention can be implemented as sets of instructions resident in the random access memory 64 of one or more computer systems 58 configured generally as described in FIG. 2. For example, the flow diagram described in FIG. 1 can be effectuated by a set of instructions resident in a memory, such as the random access memory 64. Until required by the computer system 58, the set of instructions may be stored in another computer readable memory, for example in a hard disc drive 40, or in removable memory such as an optical disc 44 for eventual use in an optical disc drive 43, or a floppy disc 42 for eventual use in a floppy disc drive 41. Storage of instructions in memory physically, chemically, electronically, and/or electromagnetically alters the memory.

The present invention can be used for the calculation of a variety of non-linear functions in a variety of applications. For example, in MPEG-2 AAC decoders and MPEG-1 Layer-3 Decoders, spectral values are Huffman coded. In the decoder, the spectral values are Huffman decoded and need to be scaled by raising them to a 4/3 exponential factor (e.g., $F(x)=x^{4/3}$) in the inverse quantization block. The Huffman decoded spectral values are in the range of 0 to 8191 ($2^{13}-1$).

Figure 3A:
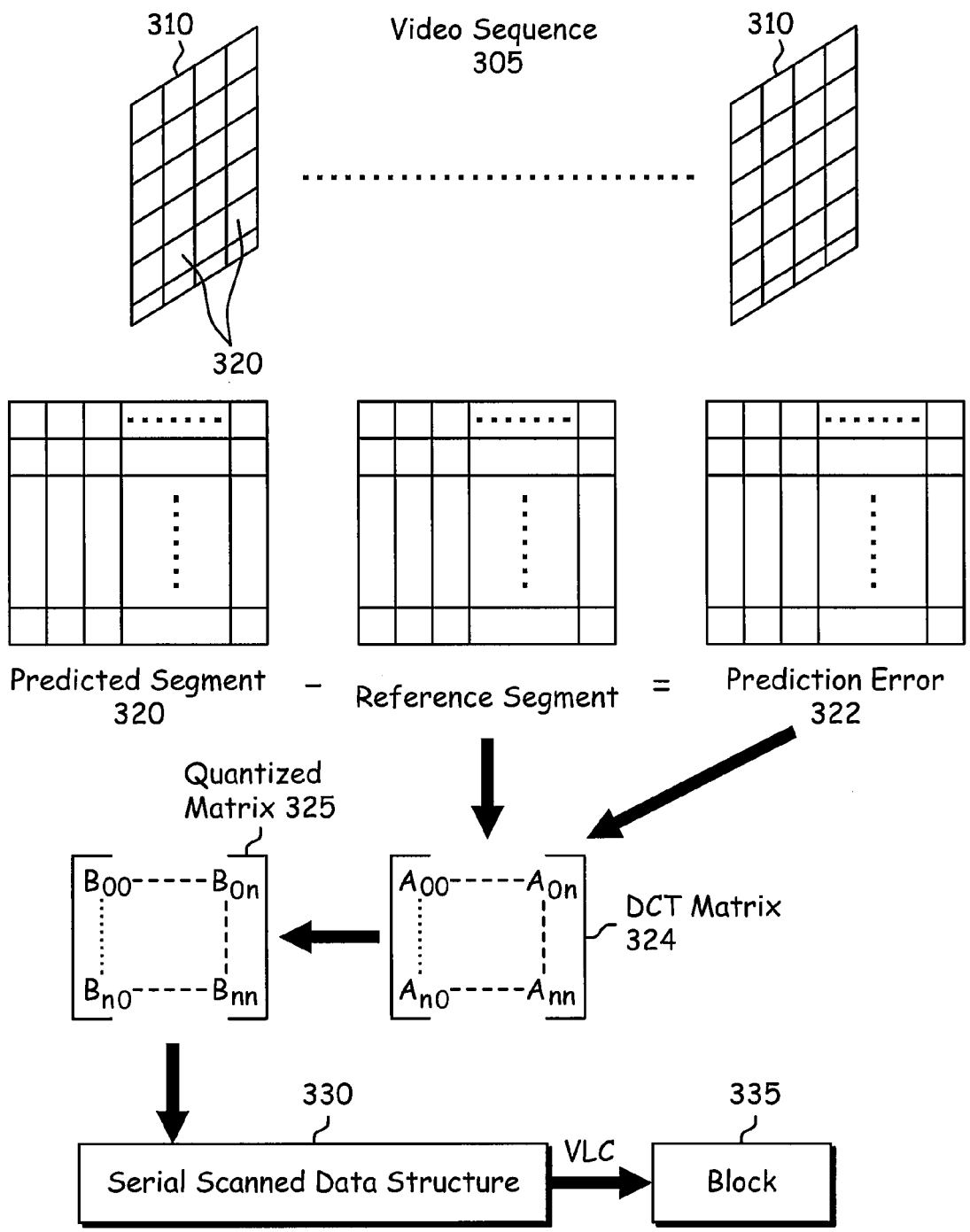
FIG. 3A is a block diagram describing the compression of video data.

Referring now to FIG. 3A, there is illustrated a block diagram describing MPEG formatting of a video sequence 305. A video sequence 305 comprises a series of frames 310. In a progressive scan, the frames 310 represent instantaneous images, while in an interlaced scan, the frames 310 comprises two fields each of which represent a portion of an image at adjacent times. Each frame comprises a two dimensional grid of pixels 315. The two-dimensional grid of pixels 315 is divided into 8×8 segments 320.

The MPEG standard takes advantage of temporal redundancies between the frames with algorithms that use motion compensation based prediction. The frames 310 can be considered as snapshots in time of moving objects. With frames 310 occurring closely in time, it is possible to represent the content of one frame 310 based on the content of another frame 310, and information regarding the motion of the objects between the frames 310.

Accordingly, segments 320 of one frame 310 (a predicted frame) are predicted by searching segment 320 of a reference frame 310 and selecting the segment 320 in the reference frame most similar to the segment 320 in the predicted frame. A motion vector indicates the spatial displacement between the segment 320 in the predicted frame (predicted segment) and the segment 320 in the reference frame (reference segment). The difference between the pixels in the predicted segment 320 and the pixels in the reference segment 320 is represented by an 8×8 matrix known as the prediction error 322. The predicted segment 320 can be represented by the prediction error 322, and the motion vector.

In MPEG-2, the frames 310 can be represented based on the content of a previous frame 310, based on the content of a previous frame and a future frame, or not based on the content of another frame. In the case of segments 320 in frames not predicted from other frames, the pixels from the segment 320 are transformed to the frequency domain using DCT, thereby resulting in a DCT matrix 324. For predicted segments 320, the prediction error matrix is converted to the frequency domain using DCT, thereby resulting in a DCT matrix 324.

The segment 320 is small enough so that most of the pixels are similar, thereby resulting in high frequency coefficients of smaller magnitude than low frequency components. In a predicted segment 320, the prediction error matrix is likely to have low and fairly consistent magnitudes. Accordingly, the higher frequency coefficients are also likely to be small or zero. Therefore, high frequency components can be represented with less accuracy and fewer bits without noticeable quality degradation.

The coefficients of the DCT matrix 324 are quantized, using a higher number of bits to encode the lower frequency coefficients 324 and fewer bits to encode the higher frequency coefficients 324. The fewer bits for encoding the higher frequency coefficients 324 cause many of the higher frequency coefficients 324 to be encoded as zero. The foregoing results in a quantized matrix 325.

As noted above, the higher frequency coefficients in the quantized matrix 325 are more likely to contain zero value. In the quantized frequency components 325, the lower frequency coefficients are concentrated towards the upper left of the quantized matrix 325, while the higher frequency coefficients 325 are concentrated towards the lower right of the quantized matrix 325. In order to concentrate the non-zero frequency coefficients, the quantized frequency coefficients 325 are diagonally scanned starting from the top left corner and ending at the bottom right corner, thereby forming a serial scanned data structure 330.

The serial scanned data structure 330 is Huffman encoded using variable length coding, thereby resulting in blocks 335. The VLC specifies the number of zeroes preceding a non-zero frequency coefficient. A "run" value indicates the number of zeroes and a "level" value is the magnitude of the nonzero frequency component following the zeroes. After all non-zero coefficients are exhausted, an end-of-block signal (EOB) indicates the end of the block 335.

Figure 3B:
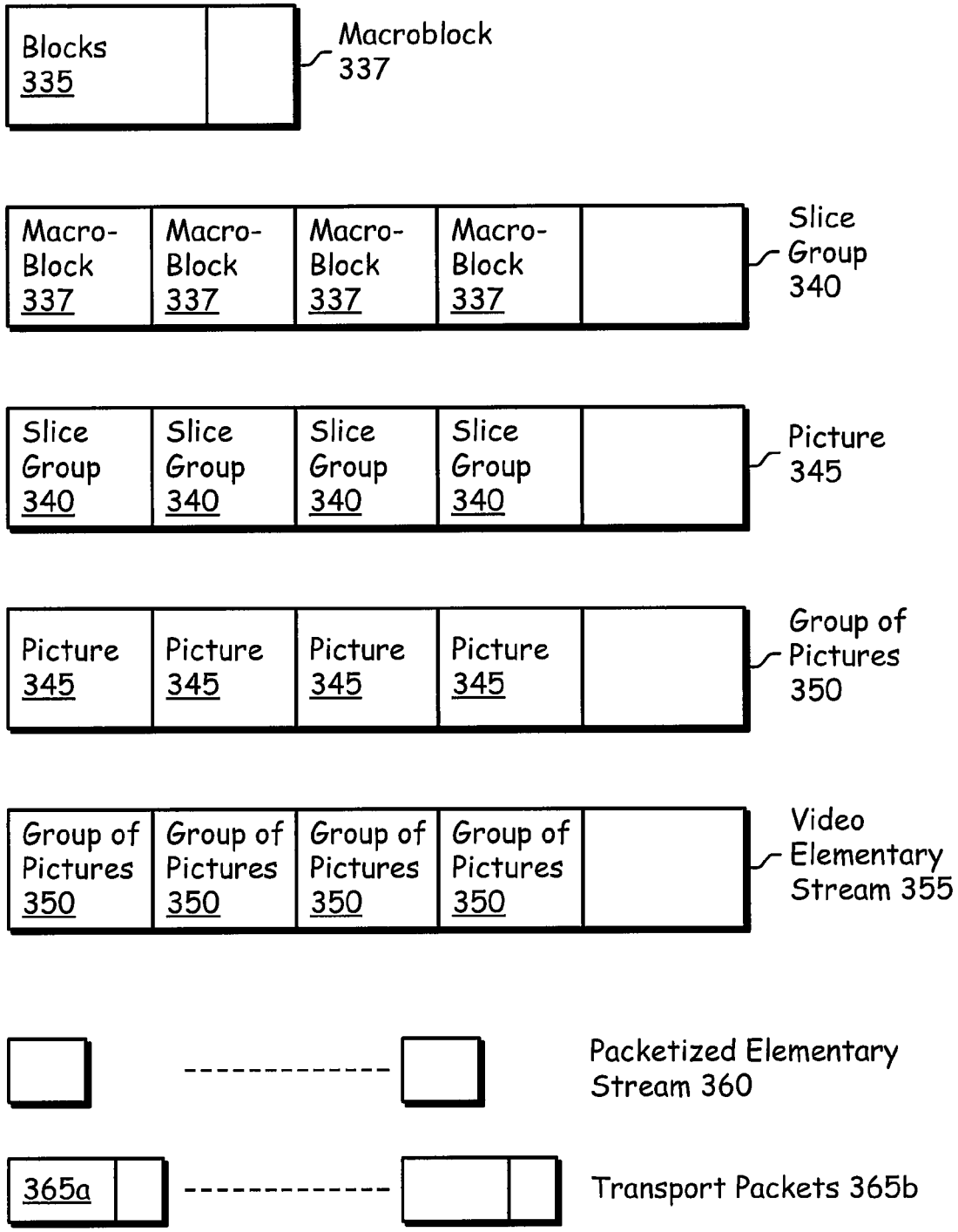
FIG. 3B is a block diagram describing the MPEG-2 hierarchy.

Continuing to FIG. 3B, a block 335 forms the data portion of a macroblock structure 337. The macroblock structure 337 also includes additional parameters, including motion vectors. Blocks 335 representing a frame are grouped into different slice groups 340. In MPEG-2, each slice group 340 contains contiguous blocks 335. The slice group 340 includes the macroblocks representing each block 335 in the slice group 340, as well as additional parameters describing the slice group. Each of the slice groups 340 forming the frame form the data portion of a picture structure 345. The picture 345 includes the slice groups 340 as well as additional parameters. The pictures are then grouped together as a group of pictures 350. Generally, a group of pictures includes pictures representing reference frames (reference pictures), and predicted frames (predicted pictures) wherein all of the predicted pictures can be predicted from the reference pictures and other predicted pictures in the group of pictures 350. The group of pictures 350 also includes additional parameters. Groups of pictures are then stored, forming what is known as a video elementary stream 355.

The video elementary stream 355 is then packetized to form a packetized elementary sequence 360. Each packet is then associated with a transport header 365a, forming what are known as transport packets 365b.

Figure 4:
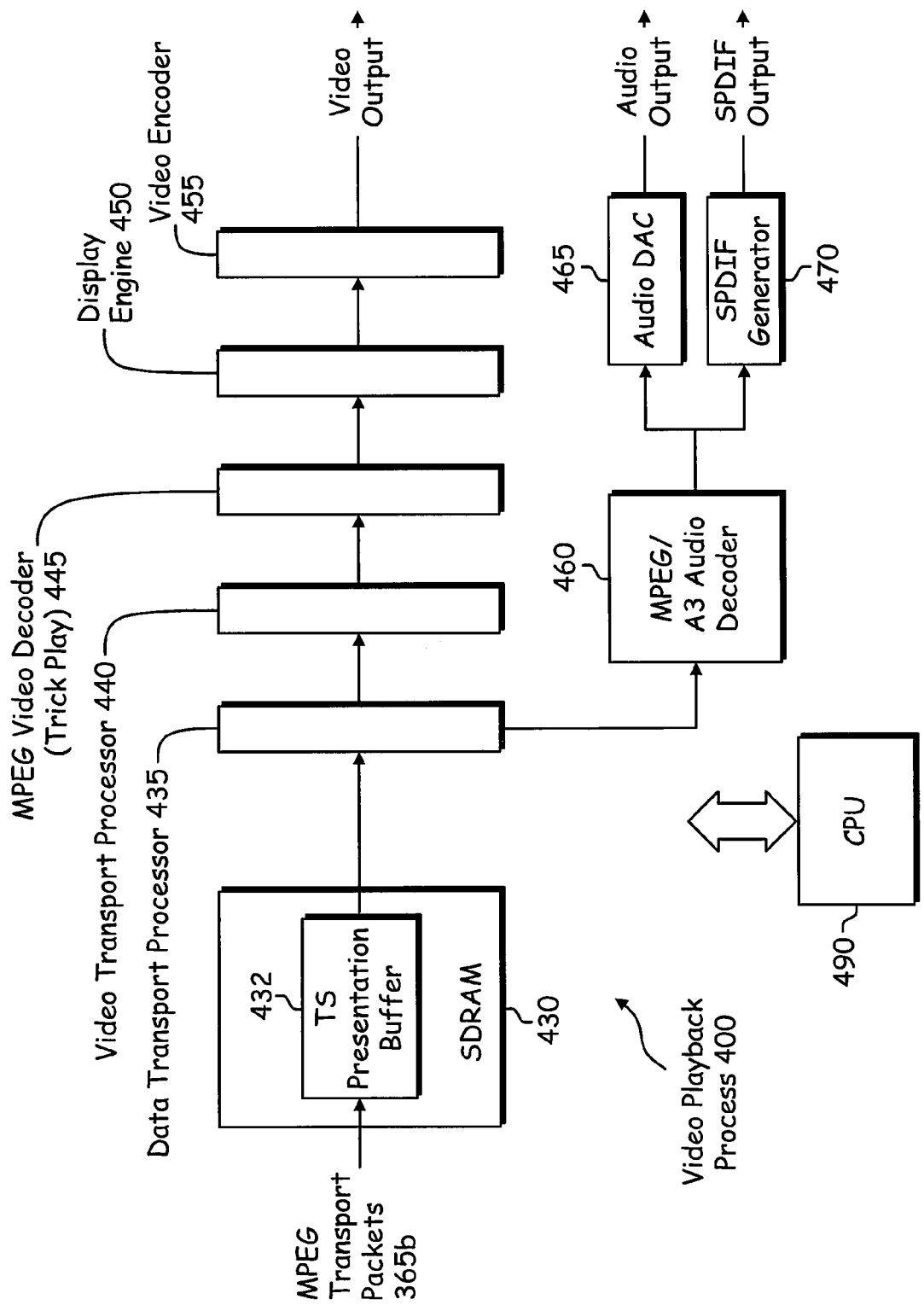
FIG. 4 is a block diagram of an exemplary decoder system in accordance with an embodiment of the present invention.

Referring now to FIG. 4, there is illustrated a block diagram of an exemplary decoder for decoding compressed video data, configured in accordance with an embodiment of the present invention. A processor, that may include a CPU 490, reads a stream of transport packets 365b (a transport stream) into a transport stream buffer 432 within an SDRAM 430. The data is output from the transport stream presentation buffer 432 and is then passed to a data transport processor 435. The data transport processor then demultiplexes the MPEG transport stream into its PES constituents and passes the audio transport stream to an audio decoder 460 and the video transport stream to a video transport processor 440. The video transport processor 440 converts the video transport stream into a video elementary stream and provides the video elementary stream to an MPEG video decoder 445 that decodes the video. The audio data is sent to the output blocks and the video is sent to a display engine 450. The display engine 450 is responsible for and operable to scale the video picture, render the graphics, and construct the complete display, among other functions. Once the display is ready to be presented, it is passed to a video encoder 455 where it is converted to analog video using an internal digital to analog converter (DAC). The digital audio is converted to analog in the audio digital to analog converter (DAC) 465.

Figure 5:
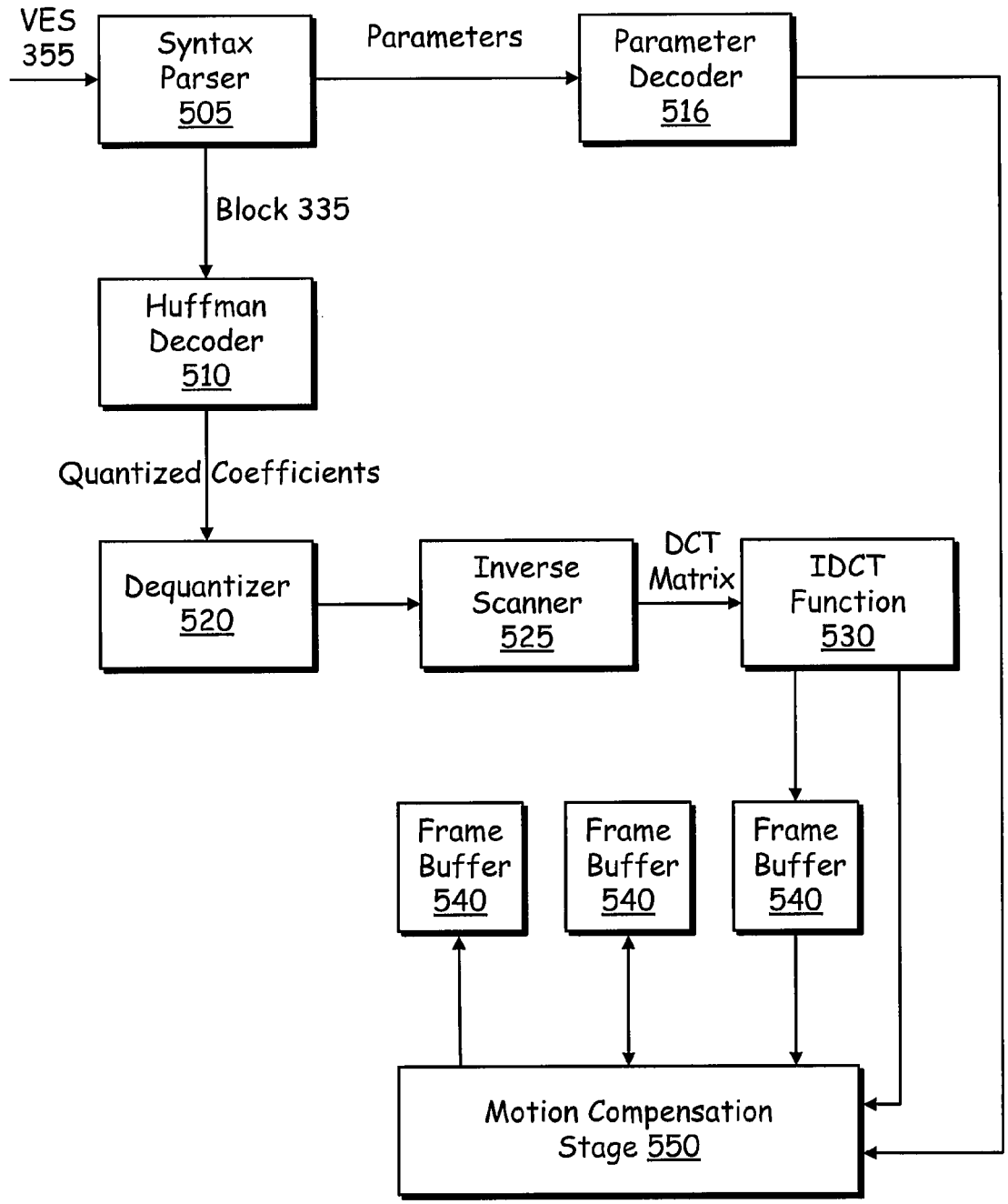
FIG. 5 is a block diagram of a video decoder in accordance with an embodiment of the present invention.

Referring now to FIG. 5, there is illustrated a block diagram of an MPEG video decoder 445 in accordance with an embodiment of the present invention. The MPEG video decoder 445 comprises three functional stages—a parsing stage, an inverse transformation stage, and a motion compensation stage. The parsing stage receives the video elementary stream, decodes the parameters, and decodes the variable length code. The parsing stage includes a syntax parser 505, a run level Huffman decoder 510, and a parameter decoder 516.

The syntax parser 505 receives the video elementary stream 355 and separates the parameters from the blocks 335. The syntax parser 505 provides the parameters to the parameter decoder 516, and the blocks 335 to the Huffman decoder 510. The Huffman decoder 510 processes the blocks 335, and decodes each non-zero value.

The inverse transformation stage transforms the coefficients from the frequency domain to the spatial domain. The inverse transformation stage includes an inverse quantizer 520, an inverse scanner 525, and an IDCT function 530. The inverse quantizer 520 dequantizes the non-zero values, while the inverse scanner 525 inverts the zig-zag scanning. The result is the DCT matrix.

The inverse DCT quantizer 520 scales each non-zero value by an exponential factor of 4/3 (i.e., the value x is scaled to $x^{4/3}$) using fixed point arithmetic. The function $F(x)=x^{4/3}$ is approximated by the finite order polynomial $f(x)=a_N x^N + a_{N-1} x^{N-1} + \ldots + a_2 x^2 + a_1 x + a_0$, where the coefficients $a_N, \ldots a_0$, are constants, for a particular range, 0 to 1, of x.

The coefficients $a_N, \ldots a_0$, for the range 0 to 1, can be determined by selecting taking known $F(x)=x^{4/3}$ for N+1 non-uniform x values, $x_N \ldots x_0$, and solving N+1 equations for the N+1 coefficients, $a_N, \ldots a_0$. The equations are:

$$a_N x_0^N + a_{N-1} x_0^{N-1} + \ldots + a_2 x_0^2 + a_1 x_0 + a_0 = x_0^{4/3}$$
$$a_N x_1^N + a_{N-1} x_1^{N-1} + \ldots + a_2 x_1^2 + a_1 x_1 + a_0 = x_1^{4/3}$$
$$a_N x_2^N + a_{N-1} x_2^{N-1} + \ldots + a_2 x_2^2 + a_1 x_2 + a_0 = x_2^{4/3}$$
$$a_N x_3^N + a_{N-1} x_3^{N-1} + \ldots + a_2 x_3^2 + a_1 x_3 + a_0 = x_3^{4/3}$$
$$\vdots$$
$$a_N x_{N-1}^N + a_{N-1} x_{N-1}^{N-1} + \ldots + a_2 x_{N-1}^2 + a_1 x_{N-1} + a_0 = x_{N-1}^{4/3}$$
$$a_N x_N^N + a_{N-1} x_N^{N-1} + \ldots + a_2 x_N^2 + a_1 x_N + a_0 = x_N^{4/3}$$

The foregoing equations can be represented in matrix form as:

$$\begin{bmatrix} x_0^N & x_0^{N-1} & \ldots & x_0^2 & x_0 \\ x_1^N & x_1^{N-1} & \ldots & x_1^2 & x_1 \\ x_2^N & x_2^{N-1} & \ldots & x_2^2 & x_2 \\ x_3^N & x_3^{N-1} & \ldots & x_3^2 & x_3 \\ & & \vdots & & \\ x_{N-1}^N & x_{N-1}^{N-1} & \ldots & x_{N-1}^2 & x_{N-1} \\ x_N^N & x_N^{N-1} & \ldots & x_N^2 & x_N \end{bmatrix} \begin{bmatrix} a_N \\ a_{N-1} \\ a_{N-2} \\ a_{N-3} \\ \vdots \\ a_1 \\ a_N \end{bmatrix} = \begin{bmatrix} x_0^{4/3} \\ x_1^{4/3} \\ x_2^{4/3} \\ x_3^{4/3} \\ \vdots \\ x_{N-1}^{4/3} \\ x_N^{4/3} \end{bmatrix}$$

So $X_{(N+1)*(N+1)} A_{(N+1)*1} = F_{(N+1)*1}$ and $A = X^{-1} F$

Where $X^{-1}$ is the inverse of X of order (N+1) (N+1).

F is the matrix of all the values computed for F(x) at different points $x_0, \ldots x_n$.

The values for all the coefficients in matrix A are obtained by finding the inverse of the matrix X and multiplying by F to get the final values, $a_N \ldots a_0$. The matrix X can be inverted by using standard matrix inversion techniques such as Kramer's theorem.

Table 1 shows the $a_{N+1} \ldots a_0$ calculated for $x_0, \ldots x_N$ for N=5. Table 2 shows the $a_{N+1} \ldots a_0$ calculated for $x_0, \ldots x_N$ for N=6. Table 3 shows the $a_{N+1} \ldots a_0$ calculated for $x_0, \ldots x_N$ for N=7.

| | 5th Order Polynomial coefficients (All the coefficients to be represented in Q2.30 format) | 6th Order Polynomial coefficients (All the coefficients to be represented in Q2.30 format) | 7th Order Polynomial coefficients (All the coefficients to be represented in Q4.28 format) |
|---|---|---|---|
| a7 | — | — | −0.61353311 |
| a6 | — | 0.29834668 | 2.50093055 |

-continued

| | 5th Order Polynomial coefficients (All the coefficients to be represented in Q2.30 format) | 6th Order Polynomial coefficients (All the coefficients to be represented in Q2.30 format) | 7th Order Polynomial coefficients (All the coefficients to be represented in Q4.28 format) |
|---|---|---|---|
| a5 | −0.25422570 | −1.14628227 | −4.35137926 |
| a4 | 0.84513485 | 1.86846396 | 4.30020246 |
| a3 | −1.19675124 | −1.76525084 | −2.79291881 |
| a2 | 1.19253645 | 1.35116738 | 1.58919123 |
| a1 | 0.41957093 | 0.39900411 | 0.37168372 |
| a0 | −0.00635179 | −0.00540662 | −0.00424042 |

For x values outside the range 0 to 1, the x value is scaled. For example, 1 to 8191 can be divided into 12 ranges, 1 to 2, 2 to 4, 4 to 8, 8 to 16, 16 to 32, 32 to 64, 64 to 128, 128 to 256, 256 to 512, 512 to 1024, 1024 to 2048, 2048 to 4096, and 4096 to 8191. The scaled value for x in a range defined by min to max is:

Scaled Value=(x/max) so the scaled value will always be less than 1 as desired to do all operations in Q(1, 31) format.

It is noted that max value is an integer power of two. So, the division can be performed by simply doing appropriate number of left shifts. For example ((x/64)*2^31) (assuming the number x was in the range of 32<=x<64, the term 2^31 is multiplied to represent the number in Q(1, 31) format) can be achieved by doing 25 left shifts on x. So, the normalized number is represented in Q(1, 31) format to compute its value for that non linear function.

The polynomial $f(x)=a_N x^N + a_{N-1} x^{N-1} + \ldots + a_2 x^2 + a_1 x + a_0$ is calculated for the scaled value. The result, f(scaled value) is then denormalized by multiplying f(scaled value) by a scaling constant. The scaling constant is a unique constant for each defined range. For example, the following scaling coefficients can be used:

TABLE 4

Scaling Coefficients

| Range | Scaling Constant |
|---|---|
| 1 to 2 | 2.5198233 (format Q3.29) |
| 2 to 4 | 6.3496343 (format Q4.28) |
| 4 to 8 | 16.000000 (format Q6.26) |
| 8 to 16 | 40.317533 (format Q7.25) |
| 16 to 32 | 101.59374 (format Q8.24) |
| 32 to 64 | 256.00000 (format Q10.22) |
| 64 to 128 | 645.15232 (format Q11.21) |
| 128 to 256 | 1625.5233 (format Q12.20) |
| 256 to 512 | 4096.0000 (format Q14.18) |
| 512 to 1024 | 10321.273 (format Q15.17) |
| 1024 to 2048 | 26007.978 (format Q16.16) |
| 2048 to 4096 | 65536.000 (format Q18.14) |
| 4096 to 8191 | 165140.37 (format Q19.13) |

Any one of the sets of foregoing coefficients and scaling constants can be stored in the decoder system as fixed point numbers. The scaling constants and the set of foregoing constants for N=5, achieve margin of error, E<1.5, for 0<=x<=8191. The scaling constants and the set of foregoing constants for N=6, achieve margin of error, E<0.5, for 0<=x<=8191. The scaling constants and the set of foregoing constants for N=7, achieve margin of error, E<0.06, for 0<=x<=8191.

Figure 6:
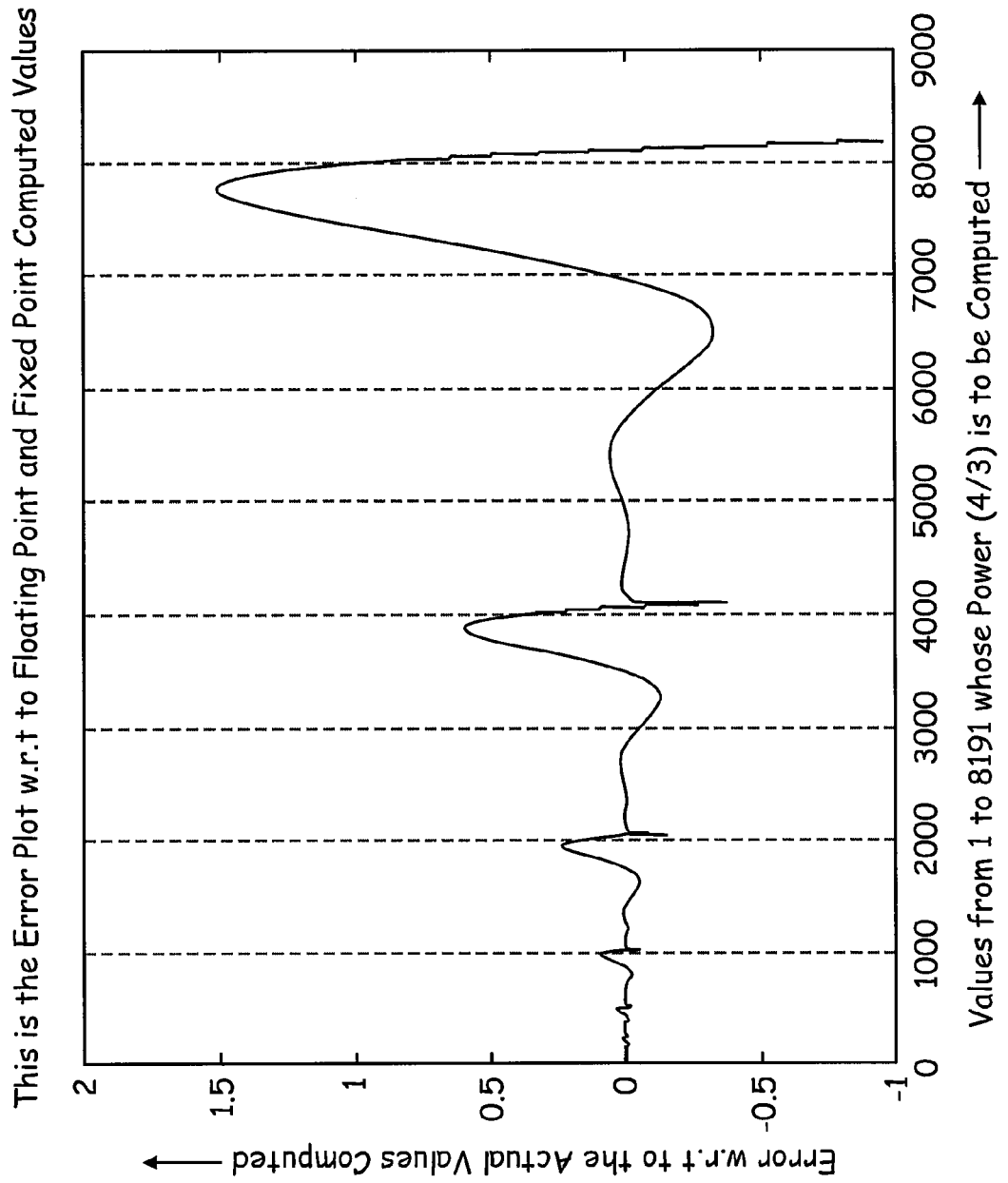
FIG. 6 is a graph of the error for an exemplary fifth order polynomial for calculating a non-linear function.

Referring now to FIG. 6, there is illustrated a graph of the error as a function of x, E(x), for $f(x)=a_N x^N + a_{N-1} x^{N-1} + \ldots + a_2 x^2 + a_1 x + a_0$, for N=5 using the coefficients in TABLE 1, and the scaling coefficients in TABLE 4. The maximum error, E~1.5, for x~7800. As can be seen, the error is the highest near the maximum points of each range and the lowest near the minimum points of each range.

Figure 7:
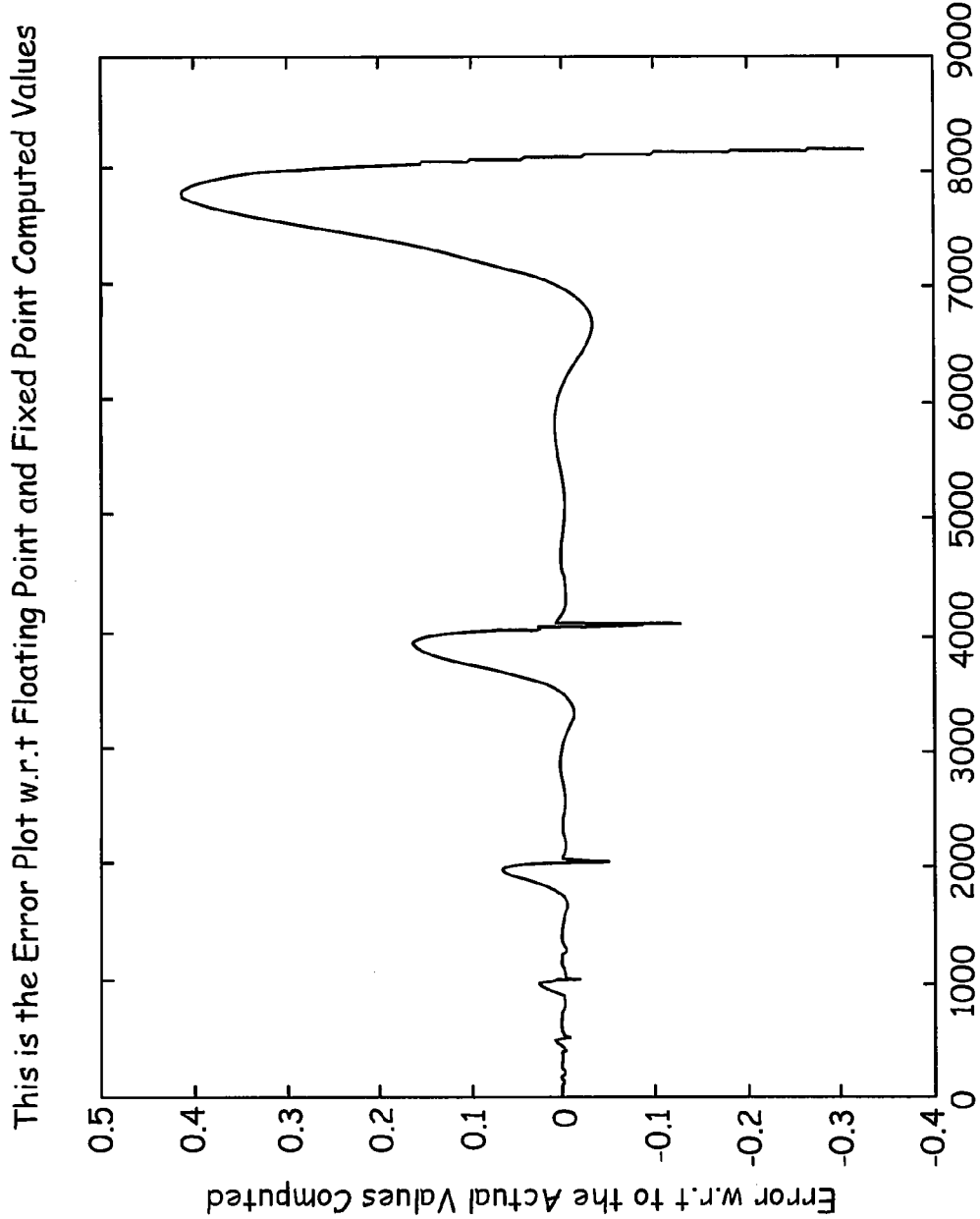
FIG. 7 is a graph of the error for an exemplary sixth order polynomial for calculating a non-linear function.

Referring now to FIG. 7, there is illustrated a graph of the error as a function of x, E(x), for $f(x)=a_N x^N + a_{N-1} x^{N-1} + \ldots + a_2 x^2 + a_1 x + a_0$, for N=6 using the coefficients in TABLE 1, and the scaling coefficients in TABLE 4. The maximum error, E~0.4, for x~7900. As can be seen, the error is the highest near the maximum points of each range and the lowest near the minimum points of each range.

Figure 8:
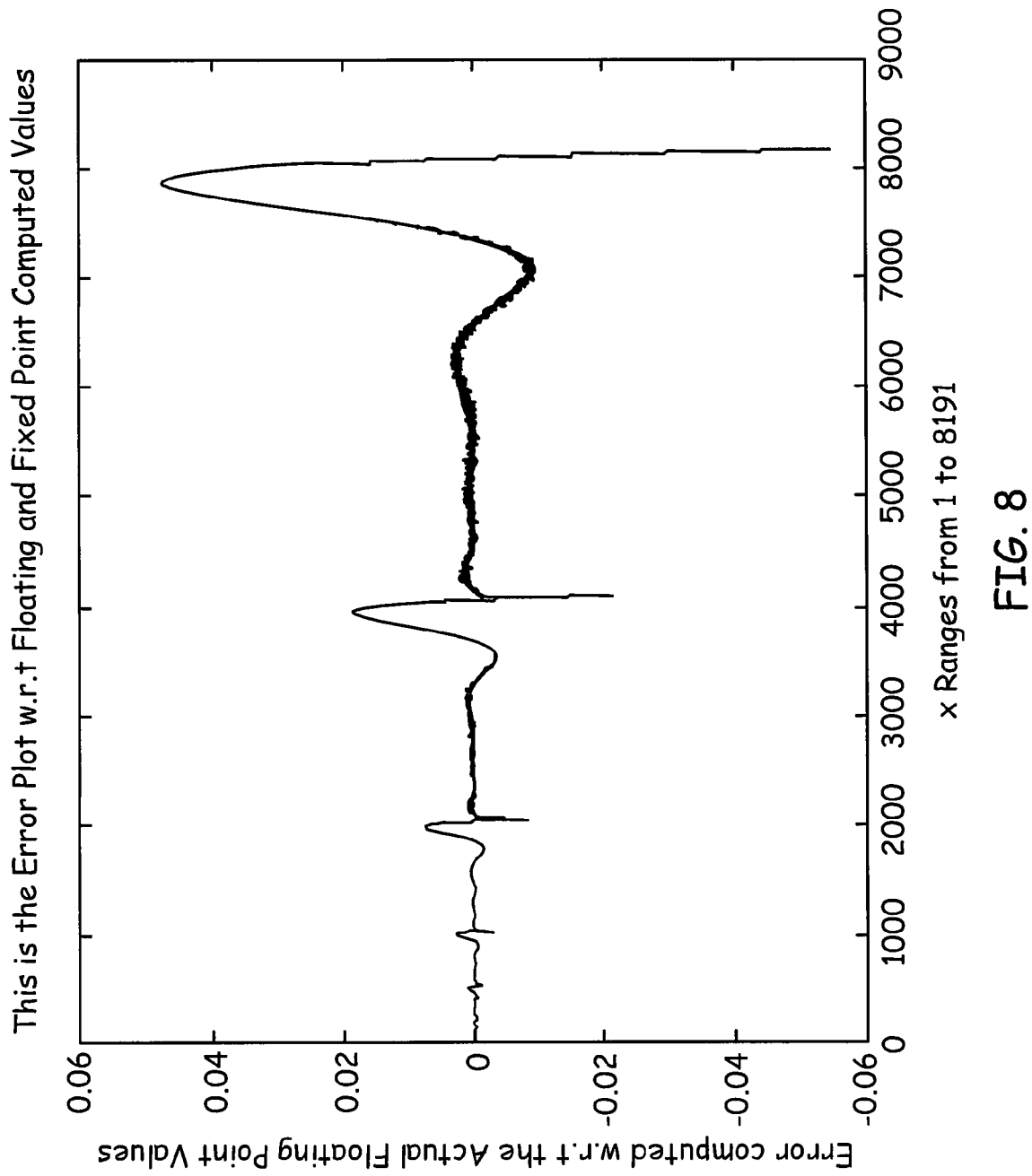
FIG. 8 is a graph of the error for an exemplary seventh order polynomial for calculating a non-linear function.

Referring now to FIG. 8, there is illustrated a graph of the error as a function of x, E(x), for $f(x)=a_N x^N + a_{N-1} x^{N-1} + \ldots + a_2 x^2 + a_1 x + a_0$, for N=5 using the coefficients in TABLE 1, and the scaling coefficients in TABLE 4. The maximum error, E~0.05, for x~8000. As can be seen, the error is the highest near the maximum points of each range and the lowest near the minimum points of each range.

Referring again to FIG. 5, the inverse quantizer 520 dequantizes the quantized values. The dequantized values are provided to the inverse scanner 525 that inverse scans the dequantized values, resulting in the DCT matrix. The IDCT converts the DCT matrix to the spatial domain. Where the block 535 decoded corresponds to a reference frame, the output of the IDCT is the pixels forming a segment 320 of the frame. The IDCT provides the pixels in a reference frame 310 to a reference frame buffer 540. The reference frame buffer combines the decoded blocks 535 to reconstruct a frame 310. The frames stored in the frame buffer 540 are provided to the display engine.

Where the block 335 decoded corresponds to a predicted frame 310, the output of the IDCT is the prediction error with respect to a segment 320 in a reference frame(s) 310. The IDCT provides the prediction error to the motion compensation stage 550. The motion compensation stage 550 also receives the motion vector(s) from the parameter decoder 516. The motion compensation stage 550 uses the motion vector(s) to select the appropriate segments 320 blocks from the reference frames 310 stored in the reference frame buffer 540. The segments 320 from the reference picture(s), offset by the prediction error, yield the pixel content associated with the predicted segment 320. Accordingly, the motion compensation stage 550 offsets the segments 320 from the reference block(s) with the prediction error, and outputs the pixels associated of the predicted segment 320. The motion compensation 550 stage provides the pixels from the predicted block to another frame buffer 540. Additionally, some predicted frames are reference frames for other predicted frames. In the case where the block is associated with a predicted frame that is a reference frame for other predicted frames, the decoded block is stored in a reference frame buffer 540.

The decoder system as described herein may be implemented as a board level product, as a single chip, application specific integrated circuit (ASIC), or with varying levels of the decoder system integrated with other portions of the system as separate components. The degree of integration of the decoder system will primarily be determined by the speed and cost considerations. Because of the sophisticated nature of modern processor, it is possible to utilize a commercially available processor, which may be implemented external to an ASIC implementation. Alternatively, if the processor is available as an ASIC core or logic block, then the commercially available processor can be implemented as part of an ASIC device wherein various operations are implemented in firmware.

While the invention has been described with reference to certain embodiments, it will be understood by those skilled in the art that various changes may be made and equivalents may be substituted without departing from the scope of the invention. In addition, many modifications may be made to adapt particular situation or material to the teachings of the invention without departing from its scope. Therefore, it is intended that the invention not be limited to the particular embodiment (s) disclosed, but that the invention will include all embodiments falling within the scope of the appended claims.

The invention claimed is:

1. A method for use in a decoder system for decoding compressed audio or video data by approximating a non-linear function for a particular value, said method comprising:
    determining a range comprising the particular value;
    scaling the value to another range, thereby resulting in a scaled value;
    calculating with fixed point arithmetic operations, a finite order polynomial function for the scaled value;
    denormalizing the finite order polynomial function for the scaled value by multiplying the finite order polynomial function with a scaling constant associated with the range comprising the particular value;
    storing a plurality of ranges including the range comprising the particular value, each of said ranges having a minimum value and maximum value in a data memory;
    receiving an input;
    calculating the denormalized polynomial function as a function of the input;
    receiving compressed audio or video data; and
    outputting decompressed audio or video data, wherein the decompressed audio or video data is a function of at least the calculated denormalized polynomial function.

2. The method of claim 1, wherein scaling the value further comprises:
    prorating the another range, based on proportion of the magnitude between the value and the minimum value and the magnitude between the maximum value and the minimum value.

3. The method of claim 1, the minimum value and the maximum value being equal to an integer power of two.

4. The method of claim 3, wherein scaling the value further comprises:
    inverting a most significant bit associated with the value, resulting in a numerator; and
    right shifting the numerator.

5. The method of claim 1, further comprising:
    storing a scaling constant for each of the plurality of ranges, including the predetermined scaling constant associated with the range comprising the particular value.

6. The method of claim 5, wherein storing the scaling constant for each of the plurality of ranges further comprises:
    storing the value of the non-linear function for the minimum value for each of the plurality of ranges.

7. The method of claim 1, wherein the non-linear function comprises $F(x)=x^{4/3}$.

8. The method of claim 7, wherein the finite order polynomial is a fifth order polynomial, and further comprising storing six coefficients, wherein:
    the first coefficient is between 0.005 and −0.015;
    the second coefficient is between 0.4 and 0.5;
    the third coefficient is between 1.1 and 1.3;
    the fourth coefficient is between −1.1 and −1.3;
    the fifth coefficient is between 0.8 and 1.0; and
    the sixth coefficient is between −0.35 and −0.15.

9. The method of claim 8, wherein the denormalized finite order polynomial for the scaled value is within 1.6 of the non-linear function for the value, if the value is between 0 and 8191.

10. The method of claim 7, wherein the finite order polynomial is a sixth order polynomial, and further comprising storing seven coefficients, wherein:
the first coefficient is between −0.1 and 0;
the second coefficient is between 0.35 and 0.45;
the third coefficient is between 1.3 and 1.4;
the fourth coefficient is between −1.7 and −1.8;
the fifth coefficient is between 1.8 and 1.9;
the sixth coefficient is between −1.1 and −1.2; and
the seventh coefficient is between 0.2 and 0.4.

11. The method of claim 10, wherein the denormalized finite order polynomial for the scaled value is within 0.5 of the non-linear function for the value, if the value is between 0 and 8191.

12. The method of claim 7, wherein the finite order polynomial is a seventh order polynomial, and further comprising storing eight coefficients, wherein:
the first coefficient is between −0.1 and 0;
the second coefficient is between 0.3 and 0.5;
the third coefficient is between 1.5 and 1.7;
the fourth coefficient is between −2.7 and −2.9;
the fifth coefficient is between 4.2 and 4.4;
the sixth coefficient is between −4.25 and −4.45;
the seventh coefficient is between 2.4 and 2.6; and the eighth coefficient is between −0.5 and −0.7.

13. The method of claim 12, wherein the denormalized finite order polynomial for the scaled value is within 0.06 of the non-linear function for the value, if the value is between 0 and 8191.

14. A circuit for use in a decoder system for decoding compressed audio and/or video data by approximating a non-linear function for a particular value, said circuit comprising:
a processor; and
memory connected to the processor, the memory storing a plurality of instructions executable by the processor, wherein execution of the plurality of instructions causes:
determining a range comprising the particular value;
scaling the value to another range, thereby resulting in a scaled value;
calculating with fixed point arithmetic operations, a finite order polynomial function for the scaled value;
denormalizing the finite order polynomial function for the scaled value by multiplying the finite order polynomial function with a scaling constant associated with the range comprising the particular value;
receiving an input;
calculating the denormalized polynomial function as a function of the input;
receiving compressed audio or video data; and
outputting decompressed audio or video data, wherein the decompressed audio or video data is a function of at least the calculated denormalized polynomial function.

15. The circuit of claim 14, wherein scaling the value further comprises:
prorating the another range, based on proportion of the magnitude between the value and the minimum value and the magnitude between the maximum value and the minimum value.

16. The circuit of claim 14, the minimum value and the maximum value being equal to an integer power of two.

17. The circuit of claim 16, wherein scaling the value further comprises:
inverting a most significant bit associated with the value, resulting in a numerator; and
right shifting the numerator.

18. The circuit of claim 14, wherein the memory stores a scaling constant for each of the plurality of ranges, including the predetermined scaling constant associated with the range comprising the particular value.

19. The circuit of claim 18, wherein the scaling constant for each of the plurality of ranges comprises the value of the non-linear function for the minimum value for the range.

20. The circuit of claim 14, wherein the non-linear function comprises $F(x)=x^{4/3}$.

21. The circuit of claim 20, wherein the finite order polynomial is a fifth order polynomial, and wherein the memory stores six coefficients, wherein:
the first coefficient is between 0.005 and −0.015;
the second coefficient is between 0.4 and 0.5;
the third coefficient is between 1.1 and 1.3;
the fourth coefficient is between −1.1 and −1.3;
the fifth coefficient is between 0.8 and 1.0; and
the sixth coefficient is between −0.35 and −0.15.

22. The circuit of claim 21, wherein the denormalized finite order polynomial for the scaled value is within 1.6 of the non-linear function for the value, if the value is between 0 and 8191.

23. The circuit of claim 20, wherein the finite order polynomial is a sixth order polynomial, and wherein the memory stores seven coefficients, wherein:
the first coefficient is between −0.1 and 0;
the second coefficient is between 0.35 and 0.45;
the third coefficient is between 1.3 and 1.4;
the fourth coefficient is between −1.7 and −1.8;
the fifth coefficient is between 1.8 and 1.9;
the sixth coefficient is between −1.1 and −1.2; and
the seventh coefficient is between 0.2 and 0.4.

24. The circuit of claim 23, wherein the denormalized finite order polynomial for the scaled value is within 0.5 of the non-linear function for the value, if the value is 0 and 8191.

25. The circuit of claim 20, wherein the finite order polynomial is a seventh order polynomial, and wherein the memory stores eight coefficients, wherein:
the first coefficient is between −0.1 and 0;
the second coefficient is between 0.3 and 0.5;
the third coefficient is between 1.5 and 1.7;
the fourth coefficient is between −2.7 and −2.9;
the fifth coefficient is between 4.2 and 4.4;
the sixth coefficient is between −4.25 and 4.45;
the seventh coefficient is between 2.4 and 2.6; and the eighth coefficient is between −0.5 and −0.7.

26. The circuit of claim 25, wherein the denormalized finite order polynomial for the scaled value is within 0.06 of the non-linear function for the value, if the value is between 0 and 8191.

* * * * *